US006834047B1

(12) United States Patent
Yoon et al.

(10) Patent No.: US 6,834,047 B1
(45) Date of Patent: Dec. 21, 2004

(54) DATA COMMUNICATION APPARATUS AND METHOD IN MULTI-CARRIER CDMA COMMUNICATION SYSTEM

(75) Inventors: Soon-Young Yoon, Seoul (KR); Ho-Kyu Choi, Seoul (KR); Yu-Suk Yun, Seoul (KR); Hoon Chang, Seoul (KR)

(73) Assignee: Samsung Electronics Co., Ltd. (KR)

( * ) Notice: Subject to any disclaimer, the term of this patent is extended or adjusted under 35 U.S.C. 154(b) by 767 days.

(21) Appl. No.: 09/711,815

(22) Filed: Nov. 13, 2000

(30) Foreign Application Priority Data

Nov. 10, 1999 (KR) ........................................ 1999-49801

(51) Int. Cl.[7] ................................................ H04B 7/216

(52) U.S. Cl. ........................ 370/342; 370/335; 370/341

(58) Field of Search ................................ 370/320, 335, 370/342, 343, 331, 332, 329, 203, 208, 209, 341, 431, 441; 455/455, 522

(56) References Cited

U.S. PATENT DOCUMENTS 6,167,270 A * 12/2000 Rezaiifar et al. ........... 455/442
6,307,849 B1 * 10/2001 Tiedemann, Jr. ............ 370/335
6,353,626 B1 * 3/2002 Sunay et al. ................ 375/130
6,377,809 B1 * 4/2002 Rezaiifar et al. ........... 455/455
6,526,030 B2 * 2/2003 Rezaiifar et al. ........... 370/335
6,621,804 B1 * 9/2003 Holtzman et al. .......... 370/329

* cited by examiner

*Primary Examiner*—Ajit Patel
(74) *Attorney, Agent, or Firm*—Dilworth & Barrese LLP

(57) ABSTRACT

There is provided a data communication apparatus and method in a multi-carrier CDMA communication system. A transmitting device determines whether a supplemental channel is transmitted. If the supplemental channel is transmitted, the transmitting device assigns the supplemental channel to each of all FAs having different carrier frequency bands and the other channels including a fundamental channel, a dedicated control channel, and a common control channel to one of the FAs. A receiving device determines whether the supplemental channel exists in input channel signals. If the supplemental channel exists, the receiving device despreads supplemental channel signals in each of the FAs, connects the despread supplemental channel signals to a supplemental channel decoder, despreads the other channels in one of the FAs, and connects the other channel signals to corresponding channel decoders.

7 Claims, 8 Drawing Sheets

500 CONTROLLER
211 FCH FCH ENCODER
217 CCCH CCCH ENCODER
215 DCCH DCCH ENCODER
213 SCH SCH ENCODER
511 DEMUX 513
515 517 519 550
ORTHOGONAL SPREADER 231 237 235 233 241 246 245 243 251 257 255 253
239 249 269 Σ
261 263 265 COMPLEX SPREADER
271 273 275 LPF
282 284 286 MODULATOR
281 283 285
FA1 FA2 FA3 290

FCH
SCH
DCCH
CCCH
211
FCH ENCODER
213
SCH ENCODER
215
DCCH ENCODER
217
CCCH ENCODER
221
DEMUX
223
DEMUX
225
DEMUX
227
DEMUX
231
233
235
237
ORTHOGONAL SPREADER
241
243
245
247
251
253
255
257
239
249
269
261
COMPLEX SPREADER
263
265
271
LPF
273
275
282
MODU-LATOR
284
286
281
283
285
290

FA1
FA2
FA3
DEMODU-LATOR
312
311
314
313
317
315
LPF
321
323
325
COMPLEX DESPREA-DER
331
333
335
341
347
345
343
351
357
355
353
361
367
365
363
ORTHOGONAL DESPREADER
CONTROLLER
600
615
617
619
613
611
MUX
650
FCH DECODER
381
CCCH DECODER
387
DCCH DECODER
385
SCH DECODER
383
FCH
CCCH
DCCH
SCH

DATA COMMUNICATION APPARATUS AND METHOD IN MULTI-CARRIER CDMA COMMUNICATION SYSTEM

PRIORITY

This application claims priority to an application entitled "Data Communication Apparatus and Method in a Multi-Carrier CDMA Communication System" filed in the Korean Industrial Property Office on Nov. 10, 1999 and assigned Serial No. 99-49801, the contents of which are hereby incorporated by reference.

BACKGROUND OF THE INVENTION

1. Field of the Invention

The present invention relates generally to a channel communication apparatus and method in a CDMA (Code Division Multiple Access) mobile communication system, and in particular, to a frequency assigning method for voice and data services and a channel transmitting and receiving apparatus and method using the same.

2. Description of the Related Art

The IS-95 CDMA communication system uses a single carrier, whereas the IMT-2000 CDMA communication system can provide multi-carrier service. The latter can provide spreading rates three times, six times, nine times, twelve times or higher than those in the former. A spreading rate based on the IS-95 standards will be referred to as "spreading rate 1" and a spreading rate three times higher than spreading rate 1 be "spreading rate 3", etc.

A conventional spreading rate 1 system uses a frequency band of 1.25 MHz for voice and data services. FIG. 1 illustrates the 1.25-MHz frequency band and a single carrier in the spreading rate 1 system. The 1.25-MHz frequency band is called a "Frequency Assignment (FA)".

The spreading rate 1 system transmits voice, data, and control signals associated with the voice and data transmission at the same time using the single FA. This is possible because orthogonal codes provide channelization for transmission of the voice, data; and control signals. As to the orthogonal code channels, voice is transmitted on a fundamental channel (FCH), data on a supplemental channel (SCH), and a control signal on a dedicated control channel (DCCH) or a common control channel (CCCH) depending on use of the control signal. The CCCH was a main control channel and a plurality of control channels may exist in reality. As shown in FIG. 1, the spreading rate 1 system orthogonally spreads a plurality of orthogonal code channel signals including the FCH, SCH, DCCH, and CCCH to one FA.

FIGS. 2 and 3 are respective block diagrams of a transmitting device and a receiving device in the spreading rate 1 system. The following description is conducted on the assumption that the channel transmitting and receiving device transmits and receives FCH, SCH, DCCH, and CCCH.

Referring to FIG. 2, each of channel transmitters 111, 113, 115, and 117 is comprised of an encoder, a symbol rate matcher, an interleaver, and an orthogonal spreader. Each orthogonal spreader generates an orthogonal code assigned to identify a corresponding channel. Thus, the channel transmitters 111, 113, 115, and 117 encode input signals, spread coded signals with their respective orthogonal codes, and transmit the transmission signals on their corresponding-channels. An adder 119 sums the output signals of the channel transmitters 111, 113, 115, and 117 and a complex spreader.121 complex-spreads the summed channel signals with a PN code. A low pass filter (LPF) 123 passes the PN-spread signal in the 1.25-MHz frequency band, and a modulator 127 transmits the output signal of the LPF 123 over a carrier signal received from an oscillator 125 (frequency upconversion).

Referring to FIG. 3, a demodulator 152 removes a carrier signal from an input signal (frequency downconversion) and an LPF 155 passes a signal in the 1.25-MHz frequency band from the demodulated signal. A complex despreader 157 despreads the output signal of the LPF 155 with a PN code by multiplying them and feeds the despread signal to channel receivers 161, 163, 165, and 167. Each channel receiver is comprised of an orthogonal despreader, a deinterleaver, and a decoder. Each orthogonal despreader generates an orthogonal code assigned to a corresponding channel. Thus, the channel receivers 161, 163, 165, and 167 despread the complex-despread signals with corresponding orthogonal codes and decode the orthogonally despread signals.

In operation, the channel transmitters 111, 113, 115, and 117 subject FCH, SCH, DCCH, and CCCH signals to encoding, interleaving, and orthogonal spreading. The adder 119 sums the orthogonally spread channel signals and the LPF 123 passes only a 1.25-MHz frequency band signal from the sum signal. The modulator 127 modulates the output signal of the LPF 123 using the carrier signal of the FA received from the oscillator 125 by multiplying the signals. The radio signal is converted to a baseband signal in the demodulator 153 and the LPF 155 in the receiving device. The demodulator 153 utilizes the oscillator 151 for generating the carrier of the corresponding FA like the modulator 127 in the transmitting device shown in FIG. 2. The baseband signal is orthogonally despread, divided into corresponding channel signals, deinterleaved, and channel-decoded in the channel receivers 161, 163, 165, and 167.

On the other hand, the spreading rate 3 system uses three FAs for voice and data services. That is, FCH, SCH, DCCH, and CCCH transmitters spread channel signals to three separate 1.25-MHz FAs in a multi-carrier scheme. This three FA structure for the spreading rate 3 system is illustrated in FIG. 4.

One third of each of the FCH, SCH, DCCH, and CCCH is present in each one FA in FIG. 4. FIGS. 5 and 6 are respective block diagrams of a transmitting device and a receiving device in the spreading rate 3 system.

Referring to FIG. 5, each of channel encoders 211, 213, 215, and 217 is comprised of an encoder, a symbol rate matcher, and an interleaver, for encoding corresponding input channel signals. Demultiplexers (DEMUXs) 221, 223, 225, and 227 dermultiplex the outputs of their corresponding channel encoders 211, 213, 215, and 217 and distribute the demultiplexed signals to the three FAs. Since the spreading rate 3 system uses three FAs, each of the DEMUXs 221, 223, 225, and 227 demultiplexes its corresponding channel encoder output into three signals. Four orthogonal-spreaders (231, 233, 235, 237; 241, 243, 245, 247, 249; and 251, 253, 255, 257, 259) are provided for each FA to identify four channels transmitted from four channel transmitters within the FA. Therefore, a total of 12 orthogonal spreaders are required for the three FAs. One complex spreader is needed for each FA and thus three complex spreaders 261, 263, and 265 are provided for the three FAs. LPFs 271, 273, and 275 low-pass filter the output signals of the complex spreaders 261, 263, and 265. Modulators 282, 294, and 286 are provided with oscillators 281, 283, and 285 for generating carrier frequency signals in the FAs and generate multi-carrier transmit signals.

Referring to FIG. 6, the receiving device is so configured that a receiving operation is performed in the reverse order of the transmitting operation in the transmitting device shown in FIG. 5. Demodulators 312, 314, and 317 demodulate the signals of corresponding FAs from an input multi-carrier signal using carrier frequencies related with the corresponding FAs generated from oscillators 311, 313, and 315. LPFs 321, 323, and 325 output baseband signals in the corresponding FAs. Complex despreaders 331, 333, and 335 and orthogonal despreaders (341, 343, 345, 347; 351, 353, 355, 357; and 361, 363, 365, 367) subject the baseband signals to complex depreading and orthogonal despreading. MUXs 371, 373, 375, and 377 each selectively receive a portion of the orthogonally despread signals and multiplex them. For example, the MUX 371 receives FCH signals from among the three-FA orthogonal despread signals, multiplexes them, and feeds the multiplexed signal to an FCH decoder 381.

Referring to FIGS. 5 and 6, in operation, FCH, SCH, DCCH, and CCCH signals are processed in the channel decoders 211, 213, 215, and 217. Each of the DEMUXs 221, 223, 225, and 227 demultiplexes an input channel signal to three signals in the three FAs. The demultiplexed signals are subject to orthogonal spreading in the orthogonal spreaders (231–239; 241–249; 251–259) and complex spreading in the complex spreaders 261, 263, and 265. The orthogonally spread signals are converted to radio signals while passing through the LPFs 271, 273, and 275 and the demodulators 282, 284, and 286. The radio signals are added up in the adder 290 and transmitted through an antenna. The multi-carrier radio signal is converted to baseband signals through the demodulators 312, 314, and 316 and the LPFs 321, 323, and 325 corresponding to the three FAs in the receiving device. The baseband signals are complex-PN despread in the complex despreaders 331, 333, and 335 and orthogonally despread in the orthogonal despreaders 341 to 367. The MUXs 371, 373, 375, and 377 respectively receive the orthogonally despread FCH, SCH, DCCH, and CCCH signals in the three FAs and multiplex them.

FIG. 7 illustrates a frequency assignment scheme in which voice and data are transmitted in different FAs. FIGS. 8 and 9 are respective block diagrams of a transmitting device and a receiving device according to the frequency assignment scheme.

Referring to FIGS. 7, 8, and 9, inter-frequency handoff happens when voice transmission transits to data transmission. The transmitting device and the receiving device performs the voice transmission/reception in the same manner as the FCH transmitter/receiver or the SCH transmitter/receiver in the spreading 1 system. The inter-frequency handoff is a process of switching a modulator 425 and a demodulator 457 to oscillators corresponding to an intended FA. Switches 423 and 455, controlled by an inter-frequency handoff command received from a higher layer, switch oscillators 419 and 451, respectively, corresponding to the FA for voice and oscillators 421 and 453, respectively, corresponding to the FA for data to the modulator 425 and demodulator 457, respectively.

In case voice transmission is to be switched to data transmission in the conventional system of transmitting voice and data in different FAs, the inter-frequency handoff is required, thereby increasing control complexity. Furthermore, channel transmitters and channel receivers must be provided with a plurality of oscillators to implement the inter-frequency handoff.

In addition, all of the carriers in a conventional spreading rate 3 system of CDMA 2000 communication system have the same characteristics between each of the carries transmits identical data and channels. However, each of the channel for CDMA 2000 communication system has different characteristics, as follows.

FCH (Fundamental Channel): It is constructed to be suitable for providing a voice service which has a lower transmission rate and enables a careful power control to provide a uniform service at all times.

SCH (Supplemental Channel): It is constructed to be suitable for packet service which required high transmission rate without being affected by transmission delays and allows the transmission of large amount of data through transmission rate control. Thus, more effective control can be gained by transmitting each of the channels on a different carrier based on the characteristics of each channel in the CDMA 2000 communication system.

SUMMARY OF THE INVENTION

It is, therefore, an object of the present invention to provide a frequency assigning apparatus and method for facilitating switching between voice transmission and data transmission in a multi-carrier CDMA communication system.

It is also an object of the present invention to provide a channel communication apparatus and method for facilitating switching between voice transmission and data transmission in a multi-carrier CDMA communication system.

It is another object of the present invention to provide a channel communication apparatus and method for changing the FA of a voice channel and control channels in current use to a specific FA and separately assigning a data channel to each FA if data transmission is requested in a multi-carrier CDMA communication system.

It is a further object of the present invention to provide a channel communication apparatus and method for assigning dedicated channels and common channels except for a dedicated data channel (i.e., a channel dedicated to only transmitting data signals; e.g., supplemental channel (SCH)) to a specific FA and separately assigning the dedicated data channel to each of the FAs in a multi-carrier CDMA communication system.

It is still another object of the present invention to provide a channel communication apparatus and method for distributing dedicated channels except for a dedicated data channel to all FAs and assigning a common channel to a specific FA if the dedicated data channel is not requested, and changing the FAs of the dedicated channels except for the dedicated data channel to a specific FA and separately assigning the dedicated data channel to each of the FAs if the dedicated data channel is requested in a multi-carrier CDMA communication system.

It is yet another object of the present invention to provide a channel communication apparatus and method for assigning dedicated channels except for a dedicated data channel to a specific FA and a common channel to a different FA if the dedicated data channel is not requested, and separately assigning the dedicated data channel to each of the FAs if the dedicated data channel is requested in a multi-carrier CDMA communication system.

It is a still further object of the present invention to provide a channel communication apparatus and method for distributing dedicated channels except for a dedicated data channel to all FAs and assigning a common channel to a specific FA if the dedicated data channel is not requested. If the dedicated data channel is requested, the dedicated channels except for the common channel are assigned to a specific FA different from the FA assigned to the common channel, and the dedicated data channel is separately assigned to each of the FAs.

The above objects can be achieved by providing a data communication apparatus and method in a multi-carrier CDMA communication system. A transmitting device determines whether a supplemental channel is transmitted. If the supplemental channel is transmitted, the transmitting device assigns the supplemental channel to each of those FAs having different carrier frequency bands and assigns the other channels (including a fundamental channel, a dedicated control channel, and a common control channel) to one of the FAs. A receiving device determines whether the supplemental channel exists in input channel signals. If the supplemental channel exists, the receiving device despreads supplemental channel signals in each of the FAs, connects the despread supplemental channel signals to a supplemental channel encoder, despreads the other channels in one of the FAs, and connects the other channel signals to corresponding channel decoders.

BRIEF DESCRIPTION OF THE DRAWINGS

The above and other objects, features and advantages of the present invention will become more apparent from the following detailed description when taken in conjunction with the accompanying drawings in which:

FIG. 11 is a block diagram of a transmitting device in the CDMA mobile communication system according to the embodiment of the present invention.

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

Prior to presenting a description of the present invention, it is to be appreciated that while a DCCH, an FCH, and a CCCH are dealt with in a spreading 3 system according to the embodiment of the present invention, the present invention is also applicable to any other channel and that in a CDMA communication system with a higher spreading rate than spreading rate 3.

Figure 1:
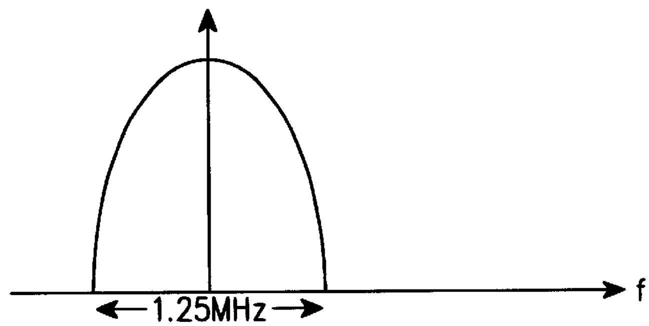
FIG. 1 is a frequency assignment diagram for a conventional spreading rate 1 system.
Figure 2:
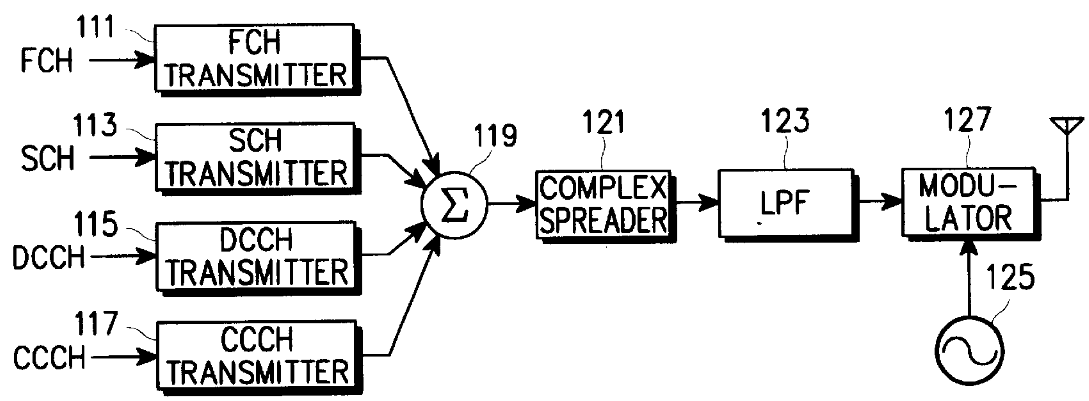
FIG. 2 is a block diagram of a transmitting device in the conventional spreading rate 1 system.
Figure 3:
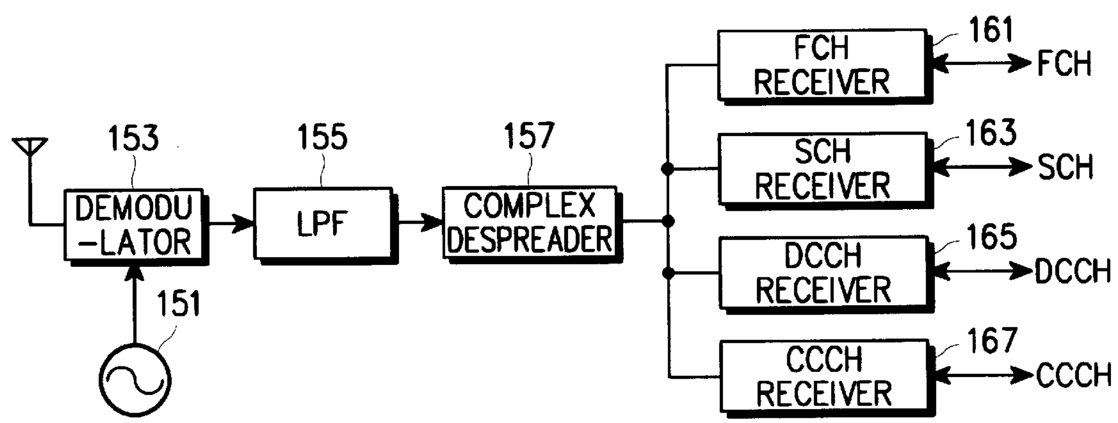
FIG. 3 is a block diagram of a receiving device in the conventional spreading rate 1 system.
Figure 4:
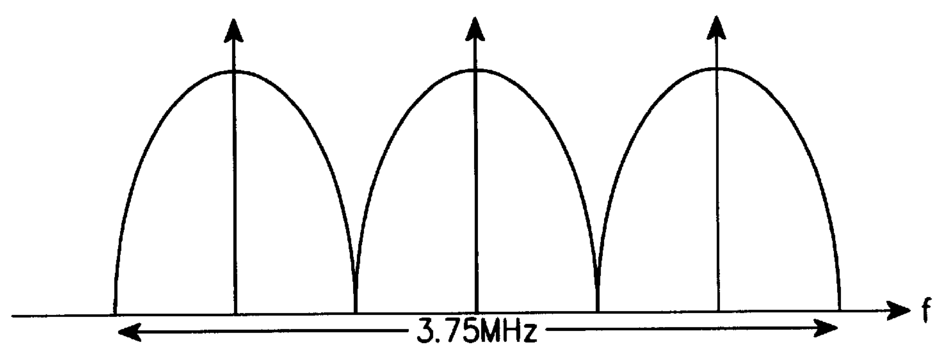
FIG. 4 is a frequency assignment diagram for a conventional spreading rate 3 system.
Figure 5:
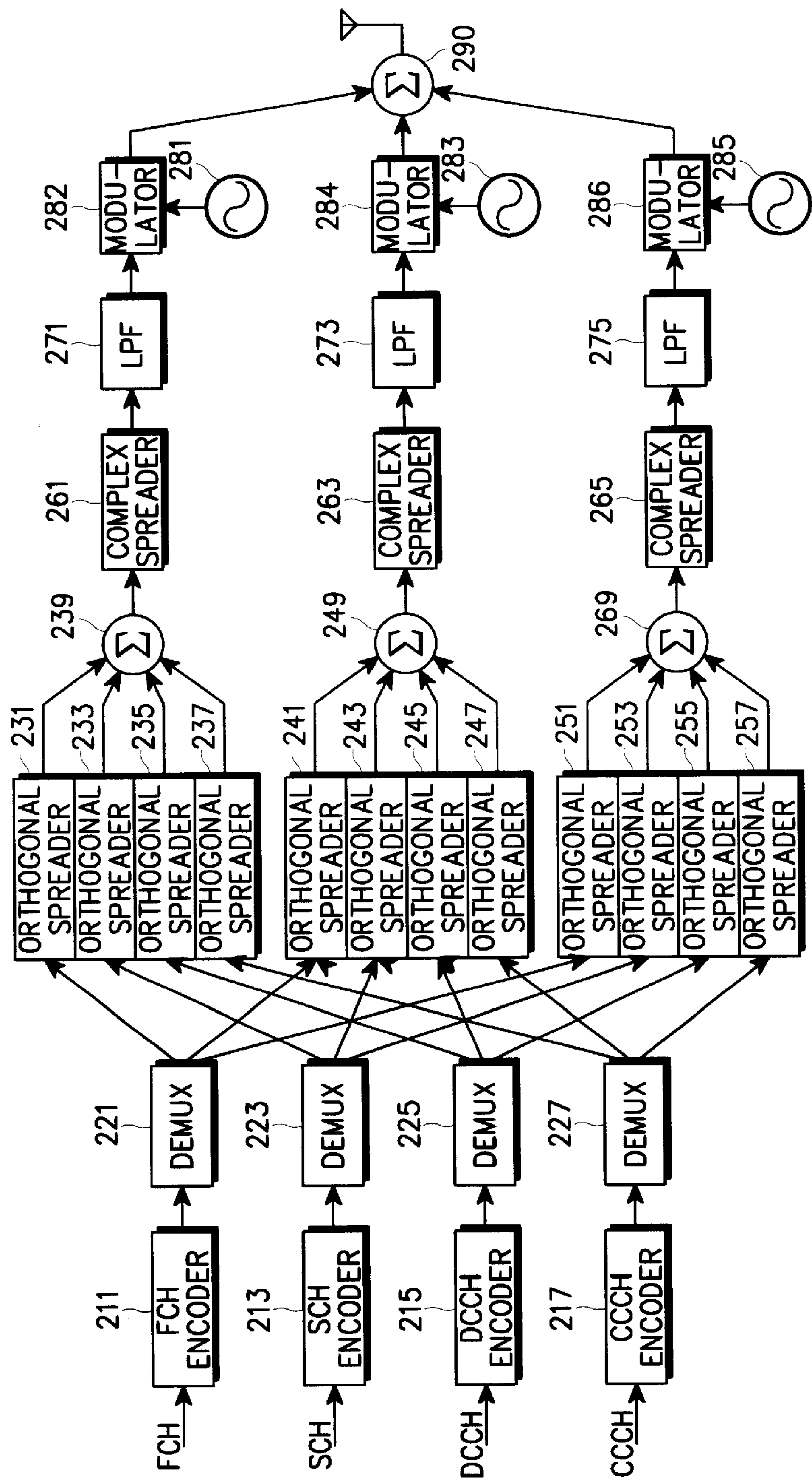
FIG. 5 is a block diagram of a transmitting device in-the conventional spreading rate 3 system.
Figure 6:
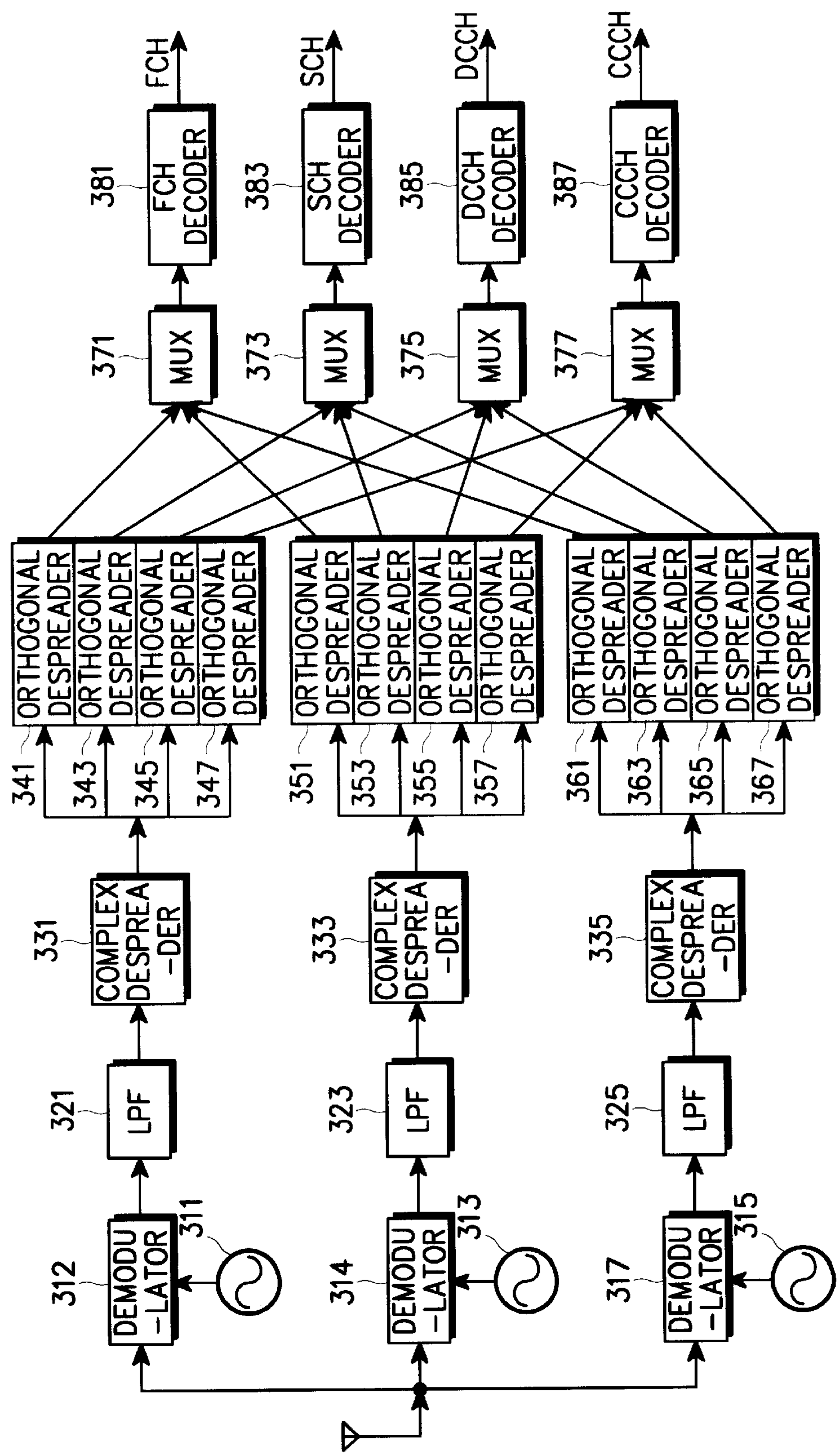
FIG. 6 is a block diagram of a receiving device in the conventional spreading rate 3 system.
Figure 7:
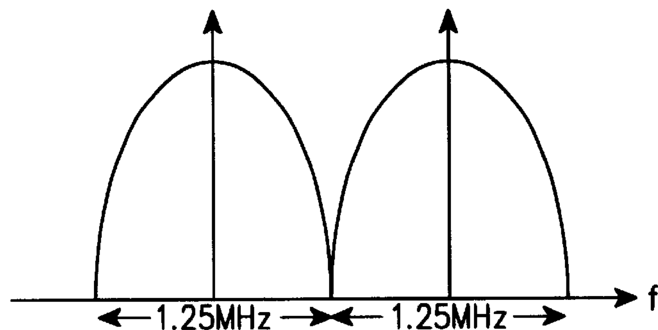
FIG. 7 is a frequency assignment diagram in a conventional system transmitting voice and data with different FAs.
Figure 8:
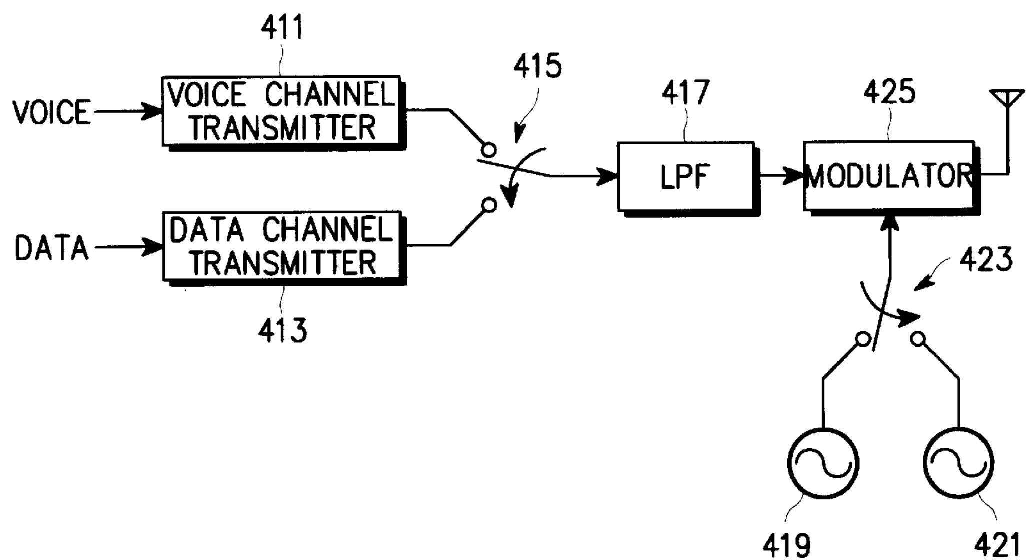
FIG. 8 is a block diagram of a transmitting device in the conventional system shown in FIG. 7.
Figure 9:
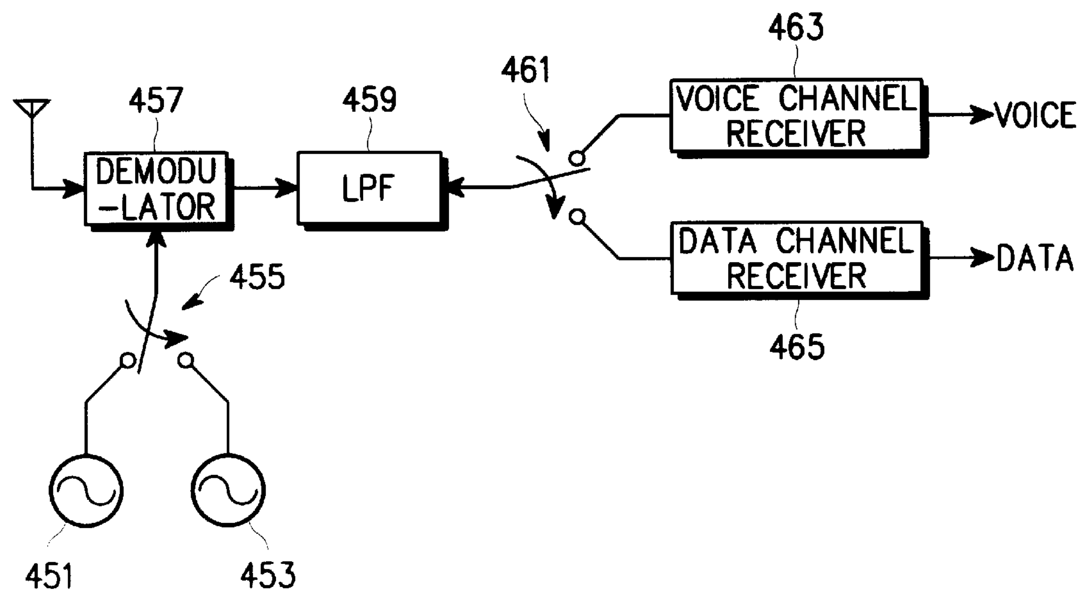
FIG. 9 is a block diagram of a receiving device in the conventional system shown in FIG. 7.
Figure 10:
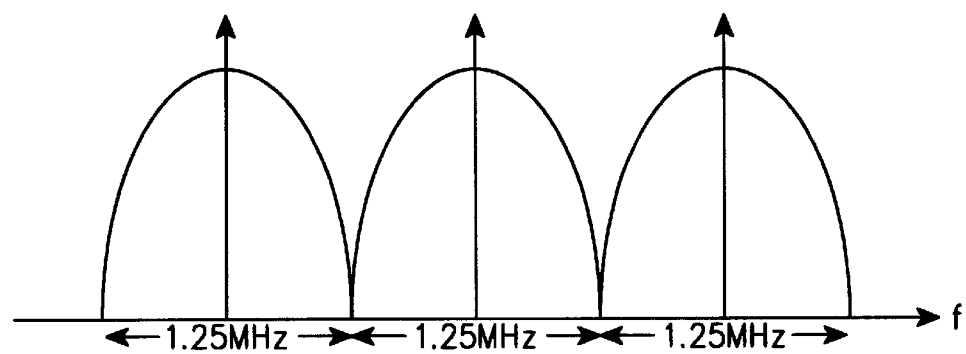
FIG. 10 is a frequency assignment diagram, in a CDMA communication system according to an embodiment of the present invention.

FIG. 10 is a frequency assignment diagram included in the present invention. The frequency assignment scheme is deployed in a spreading rate 3 CDMA communication system, by way of example. In this case, three FAs are used.

As to the frequency assignment scheme, the three FAs are numbered sequentially, starting with 1 and only FA 1, FA 2, and FA 3 are considered herein for convenience' sake, although the number of FAs is not limited.

According to the embodiment of the present invention, a base station and a mobile station may change the FA of each channel to a different FA depending on whether an SCH is used or not. If the SCH is required, the mobile station requests the SCH to the base station. In this case as well as in the case that the base station itself needs the SCH, the base station transmits FA assignment information to the mobile station and assigns the SCH to FAs. The mobile station assigns the SCH to the FAs based on the FA assignment information. On the other hand, if the SCH is not used, the base station can distribute dedicated channels including the FCH and the DCCH and a common channel to the FAs. The channels may be grouped according to users and assigned the channels to corresponding FAs. For example, if three FAs are used and 10 users are serviced, channels for user 1 to user 3 are assigned to FA 1, channels for user 4 to user 6 to FA 2, and channels for user 7 to user 10 to FA 3. If the SCH is used, the base station assigns the SCH to one FA or distributes the SCH to two or more FAs. For example, if the SCH is requested with the three FAs in use, one, two, or all of the FAs can be assigned to.

FAs are assigned as follows according to the embodiment of the present invention.

In a first frequency assignment method, FCHs, DCCHs, and CCCHs of all mobile stations are assigned to FA 1. The base station assigns an SCH for data transmission to FA 1, FA 2, and FA 3 at the same time. To do so, the SCH can be transmitted over a single carrier using one frequency channel or over multiple carriers using two or more frequency channels.

In a second frequency assignment method, if the SCH is not requested, the base station groups the FCHs and DCCHs according to users and assigns the grouped channels to FA 1, FA 2, and FA 3, respectively. The CCCHs are assigned only in FA 1. Then, if a mobile station requests the SCH, the base station assigns the FCHs and DCCHs from FA 2 and FA 3 to FA 1 and assigns the SCH separately to FA 1, FA 2, and FA 3 at the same time. As described above, the SCH can be transmitted over a single carrier using one frequency channel or over multiple carriers using two or more frequency channels.

In a third frequency assignment method, the base station assigns the FCHs and the DCCHs to FA 1 and the CCCHs to FA 3 only, if no SCH requests are issued from the mobile stations. If the SCH is requested, the base station assigns the SCH separately to FA 1, FA 2, and FA 3 at the same time. As described above, the SCH can be transmitted over a single carrier using one frequency channel or over multiple carriers using two or more frequency channels.

In a fourth frequency assignment method, the base station distributes the FCHs and the DCCHs to FA 1, FA 2, and FA 3 and the CCCHs in FA 3 only, if no SCH requests are issued from the mobile stations. If the SCH is requested, the base station changes the FCHs and DCCHs from FA 2 and FA 3 to FA 1 and assigns the SCH separately in FA 1, FA 2, and FA 3 at the same time. As described above, the SCH can be transmitted over a single carrier using one frequency channel or over multiple carriers using two or more frequency channels.

Before a transmitting device in the CDMA mobile communication system assigns an FCH for voice transmission, an SCH for data transmission, a DCCH for transmission of control information related with data and voice, and a CCCH for call set-up to a plurality of FAs with different carrier frequency band, an FA controller in the transmitting device determines whether the SCH is to be transmitted or not. If the SCH is to be transmitted, the FA controller assigns the SCH to each FA and the other channels to one specific FA.

In the CDMA mobile communication system, an FA controller in a receiving device determines whether the SCH exists in input channel signals. If the SCH exists, the FA controller despreads SCH signals assigned to all FAs and connects the despread SCH signals to an SCH encoder. Also, the FA controller despreads the other channels assigned to one of the FAs, and connects the other channel signals to corresponding channel decoders.

Figure 12:
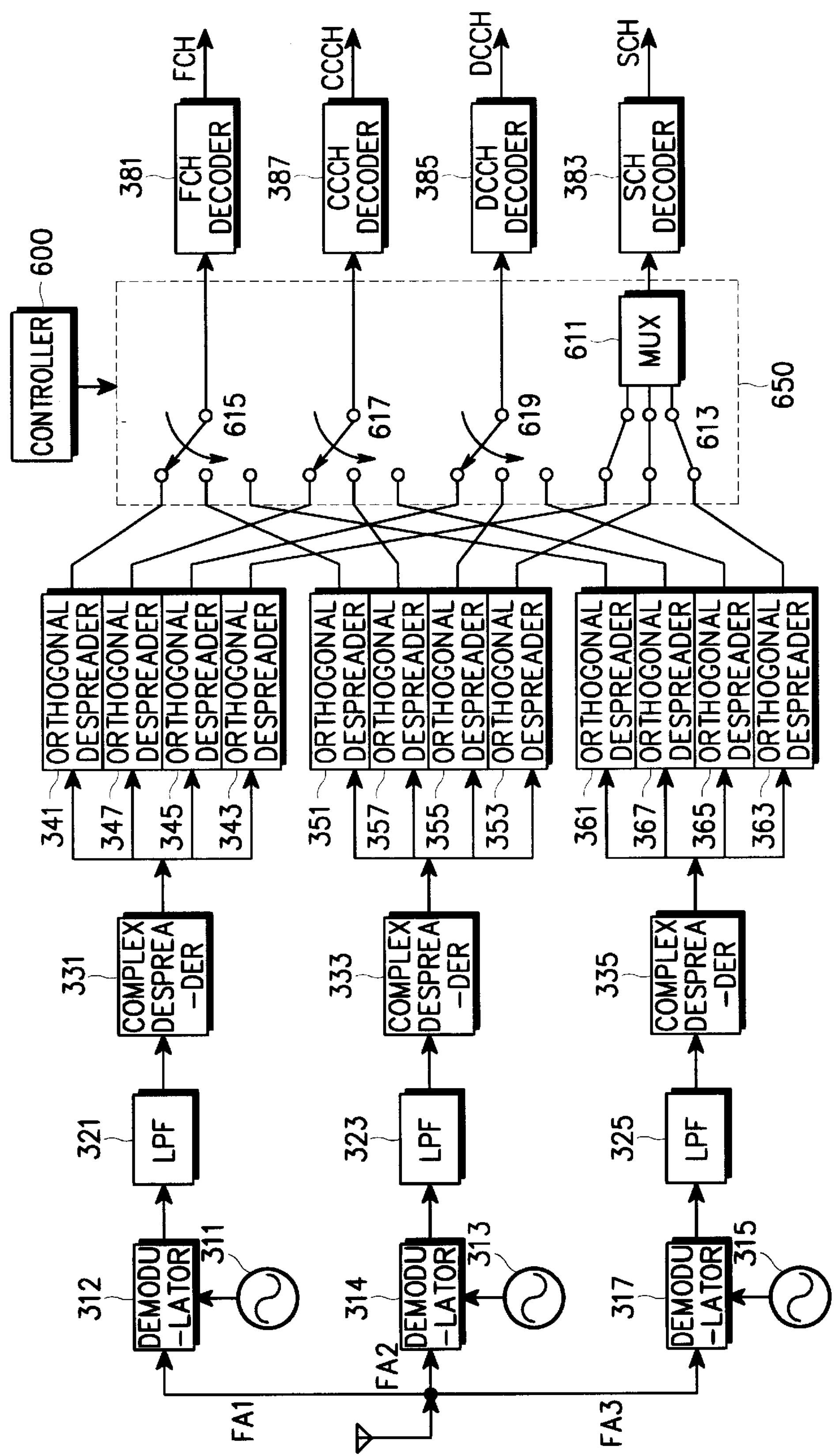
FIG. 12 is a block diagram of a receiving device in the CDMA mobile communication system according to the embodiment of the present invention.
Figure 12:
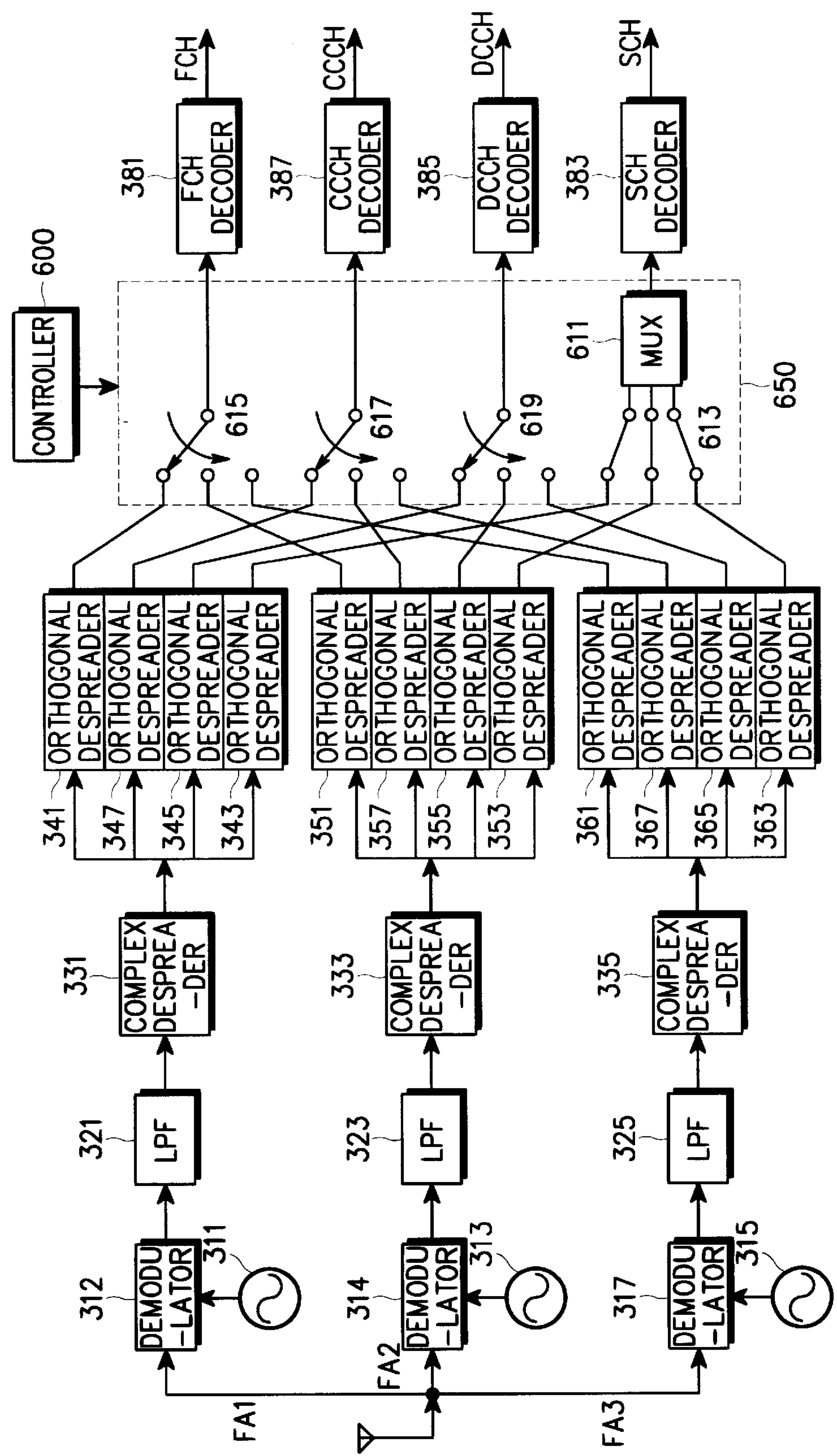

FIGS. 11 and 12 are block diagrams of a transmitting device and a receiving device in the spreading rate 3 CDMA communication system according to the embodiment of the present invention.

Referring to FIG. 11, each of the channel encoders 211, 213, 215, and 217 includes an encoder, a symbol matcher, and an interleaver, for channel-encoding a corresponding channel signal.

A frequency assignor 550 has a DEMUX 511 and switches 513, 515, 517, and 519, for assigning the frequency channels of the channel encoders 211, 213, 215, and 217. The switch 515 assigns an FCH signal received from the FCH encoder 211 to FA 1, FA 2, or FA 3 under the control of a controller 500. The switch 517 assigns a CCCH signal received from the CCCH encoder 217 to FA 1, FA 2, or FA3 under the control of the controller 500. The switch 519 assigns a DCCH signal received from the DCCH encoder 215 to FA 1, FA 2, or FA 3 under the control of the controller 500. The switch 513 assigns SCH signals demultiplexed by the DEMUX 511 to FA 1, FA.2, and FA 3 under the control of the controller 500. Therefore, the frequency assignor 550 can assign the FCH, CCCH, DCCH, and SCH signals in one of the above-described four frequency assignment methods according to whether an SCH is requested or not under the control of the controller 500.

The controller 500 and the frequency assignor 550 form an FA controller in the thus-constituted transmitting device.

Orthogonal spreaders 231, 233, 235, and 237 orthogonally spread channel signals received from the frequency assignor 550 with corresponding orthogonal codes and an adder 239 adds up the orthogonally spread signals received from the orthogonal spreaders 231, 233, 235, and 237. The sum signal is transmitted in FA 1. Orthogonal spreaders 241, 243, 245, and 246 orthogonally spread channel signals received from the frequency assignor 550 with corresponding orthogonal codes and an adder 249 adds up the orthogonally spread signals received from the orthogonal spreaders 241, 243, 245, and 246. The sum signal is transmitted in FA 2. Orthogonal spreaders 251, 253, 255, and 257 orthogonally spread channel signals received from the frequency assignor 550 with corresponding orthogonal codes and an adder 269 adds up the orthogonally spread signals received from the orthogonal spreaders 251, 253, 255, and 257. The sum signal is transmitted in FA 3.

Four orthogonal spreaders are provided for each FA in order to identify the four channel signals and thus a total of 12 orthogonal spreaders are required for the three FAs. One complex spreader is needed for each FA and thus three complex spreaders 261, 263, and 265 are provided for the three FAs. LPFs 271, 273, and 275 low-pass filter the complex spread signals, passing only 1.25-frequency band signals. Modulators 25 282, 284, and 296 generate transmit channel signals using oscillators 281, 283, and 285 that generate carrier frequency signals in the corresponding FAs.

Referring to FIG. 12, the receiving device is so configured that an input signal is processed in the reverse order of the operation in the transmitting device shown in FIG. 11. That is, demodulators 312, 314, and 317 demodulate corresponding FA signals from an input multi-carrier signal using carrier frequencies in the corresponding FAs generated from oscillators 311, 313, and 315. LPFs 321, 323, and 325 output baseband signals in the corresponding FAs. Then, complex despreaders 331, 333, and 335 and orthogonal despreaders 341 to 367 subject the baseband signals to complex despreading and orthogonal despreading.

A channel selector 650 includes a MUX 611 and switches 613, 615, 617, and 619, for selectively outputting corresponding signals among input signals in FA 1, FA 2, and FA 3 under the control of a controller 600. The switch 615 switches orthogonally spread FCH signals received in FA 1, FA 2, and FA 3 to an FCH decoder 381 under the control of the controller 600. The switch 617 switches orthogonally spread CCCH signals received in FA 1, FA 2, and FA 3 to a CCCH decoder 387 under the control of the controller 600. The switch 619 switches orthogonally spread DCCH signals received in FA 1, FA 2, and FA 3 to a DCCH decoder 385 under the control of the controller 600. The switch 613 switches orthogonally spread SCH signals received in FA 1, FA 2, and FA 3 to the MUX 611 under the control of the controller 600 and the MUX 611 multiplexes the received SCH signals and feeds the multiplexed SCH signal to an SCH decoder 383.

The frequency assignment methods according to the embodiment of the present invention will be described with reference to FIGS. 11 and 12. The DEMUX 511 and the MUX 611 operate for SCH transmission only, because each of the other channels, FCH, DCCH, and CCCH are transmitted on one channel and the SCH is transmitted on one or more channels. The frequency assignor 550, which connect the outputs of the demodulators, the filters, and the complex spreaders to the inputs of the orthogonal despreaders, operates by means of a control command received from the controller 500 in the higher layer. The control command is generated based on the frequency assignment methods with the three FAs.

In the first frequency assignment method, the switch 515 switches the output of the FCH encoder 211 to the orthogonal spreader 231 under the control of the controller 500. The switch 517 switches the output of the CCCH encoder 217 to the orthogonal spreader 237 under the control of the controller 500. The switch 519 switches the output of the DCCH encoder 215 to the orthogonal spreader 235 under the control of the controller 500. In this case, the switches 515 and 519 act as a DEMUX.

Then, if the SCH is requested, the switches 515, 517, and 519 keeps switching the channel signals in the same manner and the DEMUX 511 demultiplexes the SCH signal received from the SCH encoder 213 and feeds the demultiplexed signals to the orthogonal spreaders 233, 243, and 253.

The first to fourth frequency assignment methods can be summarized in Table 1.

TABLE 1

| Assignment methods | presence or absence of SCH | FA 1 | FA 2 | FA 3 |
|---|---|---|---|---|
| first method | | FCH DCCH CCCH SCH | SCH | SCH |
| second method | SCH absent | FCH DCCH CCCH | FCH DCCH | FCH DCCH |
| | SCH present | FCH DCCH CCCH SCH | SCH | SCH |
| third method | SCH absent | FCH DCCH | | CCCH |
| | SCH present | FCH DCCH SCH | SCH | CCCH SCH |
| fourth method | SCH absent | FCH DCCH | FCH DCCH | FCH DCCH CCCH |
| | SCH present | FCH DCCH SCH | SCH | SCH CCCH |

As described above, when data communication is requested during transmission of voice and control signals, the current frequency assignment of the FCH, DCCH, and CCCH is changed to different FAs, to thereby efficiently perform the data communication. That is, dedicated channels, the FCH and the DCCH are re-assigned to one FA. A common channel, the CCCH can be assigned to the same FA as that of the FCH and the DCCH or to a different FA. The SCH can be assigned to all the FAs at the same time.

The present invention is advantageous in that frequency assignment of the FCH, DCCH, and CCCH different from that of the SCH facilitates management of orthogonal codes, data and voice can be transmitted without the inter-frequency handoff that is a requisite operation in the conventional method of fixedly assigning voice and data in different FAs, and assignment of the CCCH to one FA only enables resources (orthogonal code and power) available for the CCH in the other FAs to be assigned to the SCH, thereby increasing SCH capacity.

In addition, the present invention has an advantage in that each channel is transmitted on a separate carrier, respectively, based on characteristic of each channel to thereby provide an effective control.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A channel transmitting device for a base station in a CDMA communication system having a plurality of frequency assignments(FAs), comprising:

a fundamental channel encoder for channel-encoding a fundamental channel signal and outputting an encoded fundamental channel signal;

a dedicated control channel encoder for channel-encoding a dedicated control channel signal and outputting an encoded dedicated control channel signal;

a supplemental channel encoder for channel-encoding a supplemental channel signal and outputting an encoded supplemental channel signal;

a common channel encoder for channel-encoding a common channel signal and outputting an encoded common channel signal;

a plurality of frequency assignors having the plurality of FAs; and a FA controller for controlling transmission of the outputs of the channel encoders, said FA controller determining whether the supplemental channel is transmitted or not, and if the supplemental channel is transmitted, assigning the supplemental channel to each of the FAs, and assigning each of the fundamental channel, dedicated control channel and common channel to one of the FAs.

2. The channel transmitting device of claim 1, wherein the FA controller distributes the outputs of the fundamental channel encoder, common channel encoder and the dedicated channel encoder to the plurality of FAs, if the supplemental channel is not transmitted.

3. The channel transmitting device of claim 1, wherein the frequency assignor comprises;

a plurality of switches for connecting the output of the channel encoders to one of the FAs, each of the switches connected between one of the channel encoders and the FAs; and a demultiplexer connected between the SCH encoder and the FAs for transmitting the output of the SCH encoder to each of the FAs.

4. A channel receiving device for a mobile station in a CDMA communication system using a plurality of FAs, comprising:

a plurality of channel selectors having the plurality of FAs;

an FA controller for handling the transmission of the outputs of the receivers, said FA controller determining whether a supplemental channel exists in the received signals, and if the supplemental channel exists, assigning the supplemental channel to each of the FAs and assigning each of the fundamental channel, dedicated control channel and common channel to one of the FAs;

a fundamental channel decoder for channel-decoding a fundamental channel signal assigned to the specific FA;

a dedicated control channel decoder for channel-decoding a dedicated control channel signal assigned to the specific FA;

a supplemental channel decoder for channel-decoding a supplemental channel signal assigned to each of the FAs; and a common channel decoder for channel-decoding a common channel signal assigned to the specific FA.

5. A method of assigning a fundamental channel for voice transmission, a supplemental channel for data transmission, a dedicated control channel for transmission of voice and data control information, and a common control channel for call set-up to a plurality of FAs having each of different carrier frequency bands in a transmitting device of a CDMA communication system, comprising the steps of:

determining whether the supplemental channel is transmitted; and assigning the supplemental channel to each of the FAs and each of the fundamental channel, dedicated control channel and common channel to one of the FAs if the supplemental channel is transmitted.

6. A method of receiving channel signals in a plurality of FAs in a CDMA communication system where a transmitting devices assigns a fundamental channel for voice transmission, a supplemental channel for data transmission, a dedicated control channel for transmission of voice and data control information, and a common control channel for call set-up to the plurality of FAs having different carrier frequency bands prior to transmission, comprising the steps of:

determining whether the supplemental channel exists in input channel signals;

despreading supplemental channel signals assigned to each of the FAs; connecting the despread supplemental channel signals to a supplemental channel decoder;

despreading the fundamental channel, dedicated control channel and common channel each assigned to one of the FAs; and connecting the fundamental channel, dedicated control channel and common channel signals to corresponding channel decoders, if the supplemental channel exists.

7. The method of claim 6, wherein all of the fundamental channel, dedicated control channel and common channel are assigned to one of the FAs.

* * * * *